Dec. 19, 1922.
J. W. STRAUSBAUGH.
ANIMAL TRAP.
FILED FEB. 20, 1922.
1,439,200.
2 SHEETS—SHEET 1.
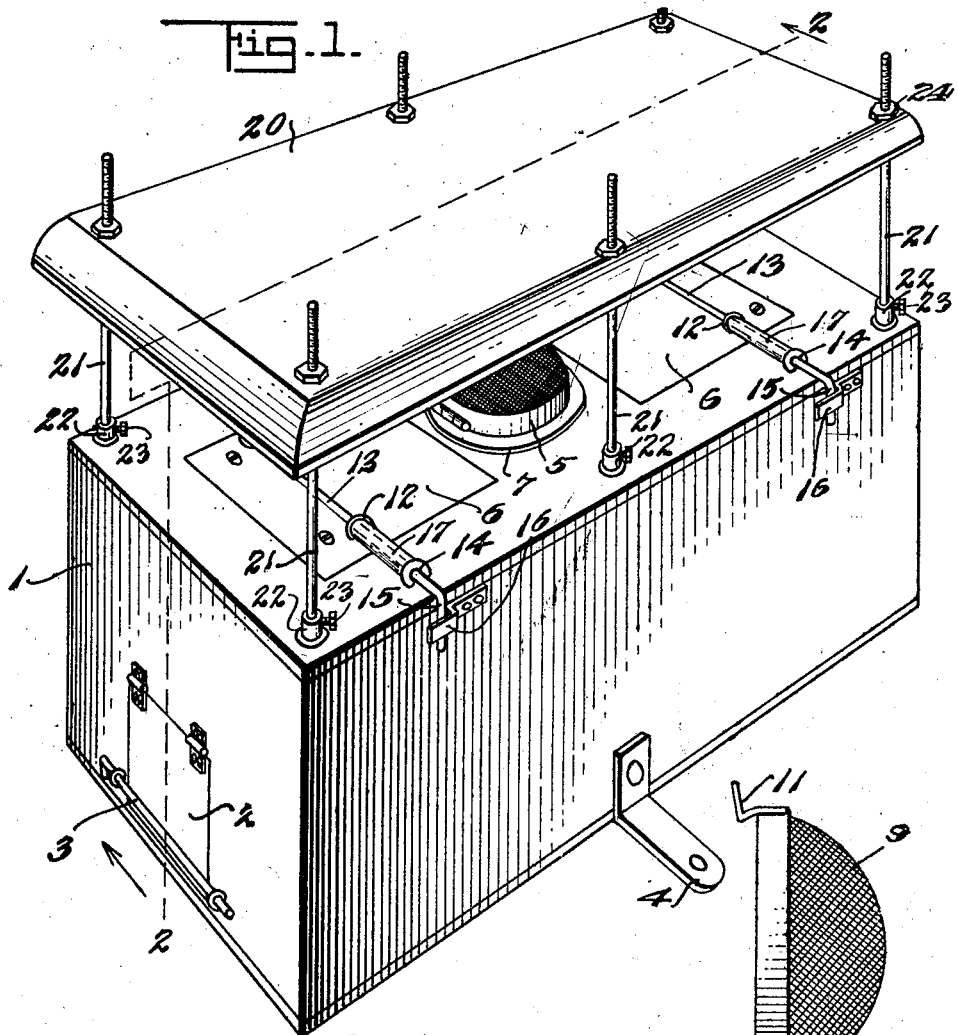
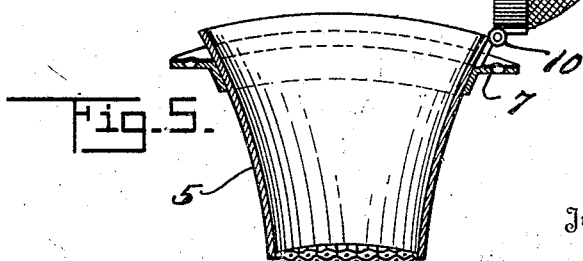
Inventor
J. W. Strausbaugh
By Robb Robb Hill
Attorney

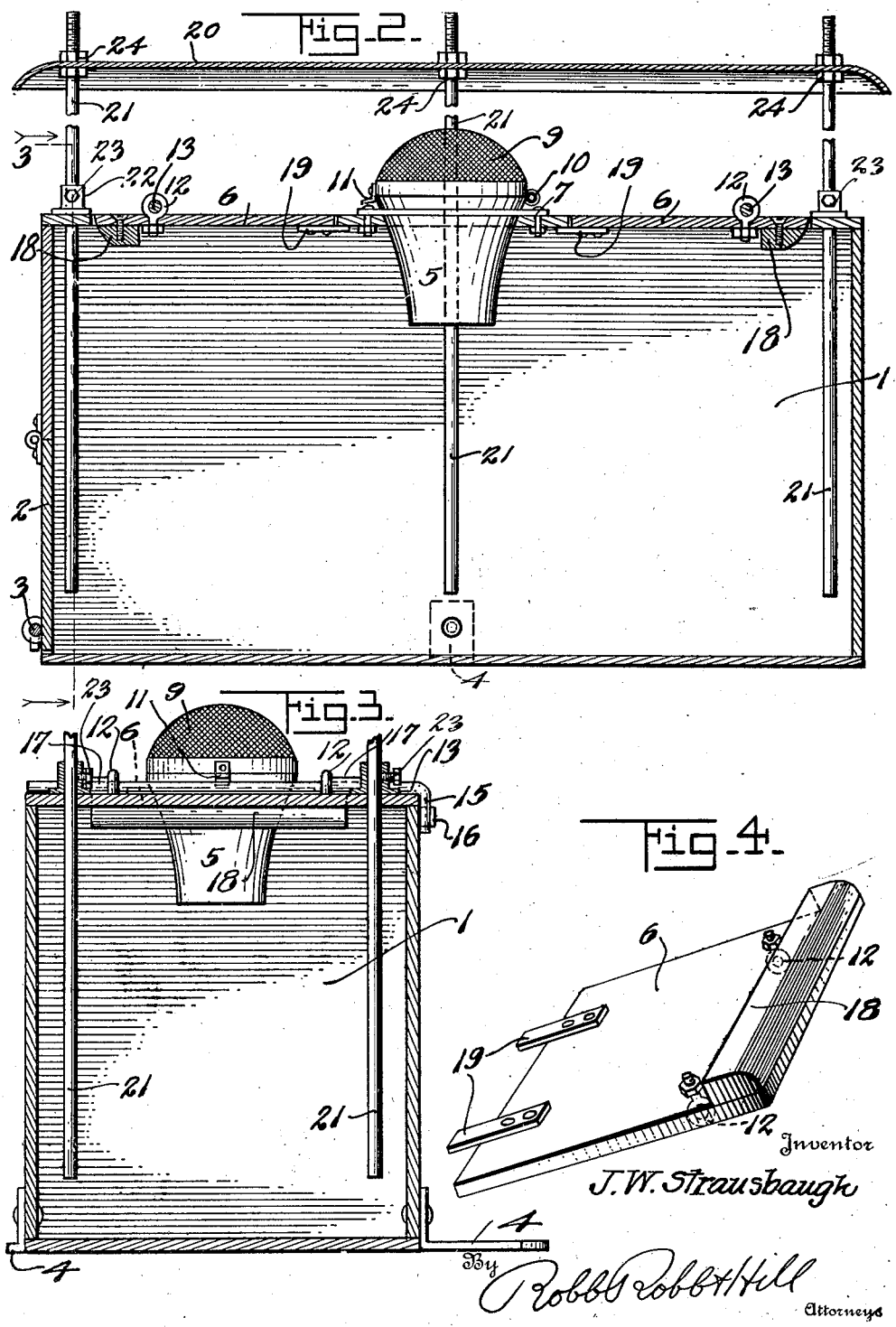

Patented Dec. 19, 1922.

1,439,200

UNITED STATES PATENT OFFICE.

JEREMIAH W. STRAUSBAUGH, OF TIFFIN, OHIO.

ANIMAL TRAP.

Application filed February 20, 1922. Serial No. 538,024.

*To all whom it may concern:*

Be it known that I, JEREMIAH W. STRAUSBAUGH, a citizen of the United States, residing at Tiffin, in the county of Seneca and State of Ohio, have invented certain new and useful Improvements in Animal Traps, of which the following is a specification.

The present invention relates to certain new and useful improvements in the construction of animal traps of that general character which are commonly known as everset traps, being provided with counterweighted trap doors which are mounted to automatically precipitate an animal into a receptacle or enclosure where it is held until it can be conveniently removed and disposed of.

Among the objects of the invention are to provide an animal trap of this character which can be used successfully in outdoor places and will not be clogged and rendered inoperative by snow, sleet or the like.

A further object of the invention is to provide a trap which can be set for small animals and which is so constructed that it is impossible for larger animals to get at the bait or open the trap doors to permit the escape of any animals which may have been previously caught.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a perspective view of an animal trap which is constructed in accordance with the invention.

Figure 2 is a longitudinal vertical sectional view taken on the line 2—2 of Figure 1.

Figure 3 is a transverse sectional view taken on the line 3—3 of Figure 2.

Figure 4 is an enlarged detail view of one of the trap doors.

Figure 5 is an enlarged sectional view of the bait chamber.

Throughout the following detailed description and on the several figures of the drawing, similar parts are referred to by like reference characters.

Referring to the drawings, which illustrate one possible embodiment of the invention, the numeral 1 designates a receptacle which may be of any suitable shape and size and may be constructed of any appropriate material, depending upon the kind of animals to be caught and the conditions under which the trap is to be used. One end of the receptacle is provided with an opening which is normally closed by a door 2, and the animals which have been trapped are intended to be removed from the receptacle through this opening. Suitable fastening means, such as that indicated at 3 may be provided for normally locking the door 2 in a closed position. The trap receptacle may be anchored or fastened in position by means of suitable brackets 4 which are shown as applied to the sides thereof. These brackets are adapted either to be secured to the floor or fastened to stakes which are driven into the ground.

The receptacle is preferably of an elongated rectangular formation and the top thereof is provided with a centrally disposed bait receptacle 5 and a pair of trap doors 6, one of which is located on each side of the bait receptacle. The bait receptacle itself extends downwardly through an opening in the top of the trap receptacle, being formed of a peripheral flange 7 which fits against and is suitably secured to the top of the trap receptacle. The trap receptacle is shown as provided with a perforated bottom 8 and also with a dome shaped perforated cover 9, the latter being hinged at 10 and provided with a latch 11, by means of which it can be locked in a closed position. The air is thus permitted to circulate freely around the bait so that it is maintained in a fresh condition and the odor freely permeates the surrounding atmosphere so that the animals will be attracted thereto. The cover 9 can be readily opened at any time for the purpose of renewing or replacing the supply of bait.

The trap doors 6 are normally in a closed position and are mounted so that when an animal approaching the bait receptacle places its weight upon the inner end of one of the trap doors, the trap door will swing downwardly and drop the animal into the trap receptacle. The trap doors are provided at points toward their outer edges with upstanding eyes 12 which are adapted to be engaged by pivot rods 13, said pivot rods extending through similar eyes 14 projecting from the top of the trap receptacle, and terminating at their ends in lateral arms 15 which can be rotated into engagement with latch members 16 to hold the pivot rods removably in position. In order to properly center the trap doors within the door openings and eliminate all unnecessary friction at the sides of the trap doors, the pivot rods 13 may be provided with sleeves 17 which are positioned between the eyes 12 on the trap doors and the eyes 14 on the trap. The trap doors are thus accurately centered within the door openings so that they can swing freely without any undue friction or binding action. The outer edges of the trap doors are provided on their lower faces with weights 18 which normally tend to swing the trap doors into a closed position, and the inner edges of the trap doors are provided with stop fingers 19 which engage the edges of the trap door openings when the trap doors are in a closed position. The trap doors are normally flush with the top of the trap receptacle, and it will be obvious that an animal in approaching the bait chamber or walking around the bait chamber in an attempt to get at the bait will sooner or later place its weight upon the inner end of one of the trap doors, which will immediately swing downwardly and drop the animal into the trap receptacle. The door will then swing upwardly into a closed position and any efforts of the animal or animals within the trap to open the trap doors will be futile, since the trap doors are prevented from swinging outwardly by the stop members 19.

An important feature of the invention resides in the guard canopy 20 which is adjustably supported over the top of the trap by means of the standards 21. This guard canopy prevents snow, sleet or the like from interfering with the trap and may also be set in such a manner as to prevent larger animals from getting at the bait receptacle or stepping upon the trap doors to open the same and permit the escape of any smaller animals which may previously have been caught by the trap. The standards 21 telescope freely within tubular guides 22 which are secured to the top of the trap receptacle, and are held in an adjusted position by means of the set screws 23. The upper ends of the standards are threaded to receive nuts 24, the canopy being clamped between a pair of the nuts on each of the standards, and the nuts being removable to permit an adjustment of the canopy upon the standards. This enables the trap to be used successfully in outdoor positions where it is exposed to the weather, and would otherwise be rendered inoperative at times by a snowfall or by the falling of branches or twigs thereon. The canopy can be raised or lowered and set at different elevations, depending upon the size of the animals to be caught and the conditions under which the trap is used.

Having thus described my invention, what I claim as new and desire to secure by Letters Patent is:

1. A trap, including a receptacle provided with a trap door opening, a trap door mounted within the opening, and guard means arranged over the trap door and adjustable in height with respect thereto.

2. An animal trap, including a receptacle having a trap door opening therein, a trap door within the opening, a canopy arranged over the trap door in a spaced relation thereto, and means whereby the elevation of the canopy may be adjusted.

3. An animal trap, including a receptacle provided with a trap door opening, a trap door, a canopy, standards for supporting the canopy, and means associated with the standards whereby the elevation of the canopy may be adjusted.

4. An animal trap, including a trap receptacle provided with a trap door opening, a trap door, a canopy, standards adjustably mounted upon the receptacle and movable up and down with respect thereto, said standards supporting the canopy.

5. An animal trap, including a receptacle provided with a trap door opening, a trap door, standards projecting from the receptacle, a canopy upon the standards, and means whereby the canopy may be adjusted upon the standards.

In testimony whereof I affix my signature.

JEREMIAH W. STRAUSBAUGH.